(12) United States Patent
Arndt et al.

(10) Patent No.: US 8,616,943 B2
(45) Date of Patent: Dec. 31, 2013

(54) PASSENGER AIR VENT

(75) Inventors: Peter Arndt, Rüsselsheim (DE); Bernd Trinkwalter, Tüschnitz (DE)

(73) Assignee: GM Global Technology Operations LLC, Detroit, MI (US)

( * ) Notice: Subject to any disclaimer, the term of this patent is extended or adjusted under 35 U.S.C. 154(b) by 748 days.

(21) Appl. No.: 12/418,253

(22) Filed: Apr. 3, 2009

(65) Prior Publication Data

US 2010/0029191 A1    Feb. 4, 2010

(30) Foreign Application Priority Data

Apr. 4, 2008  (DE) .......................... 10 2008 017 211

(51) Int. Cl.
*B60H 1/34*    (2006.01)

(52) U.S. Cl.
USPC .......................................... 454/155; 454/154

(58) Field of Classification Search
USPC .......................................... 454/154, 155, 285
See application file for complete search history.

(56) References Cited

U.S. PATENT DOCUMENTS

| | | | | |
|---|---|---|---|---|
| 4,006,673 A | * | 2/1977 | Meyer et al. ................... | 454/154 |
| 4,092,907 A | * | 6/1978 | Meyer et al. ................... | 454/154 |
| 4,653,386 A | * | 3/1987 | Hayakawa et al. ............ | 454/316 |
| 5,397,267 A | * | 3/1995 | Vecellio et al. ................ | 454/155 |
| 5,741,179 A | * | 4/1998 | Sun et al. ....................... | 454/155 |
| 6,394,891 B1 | | 5/2002 | Arold | |
| 6,582,293 B1 | * | 6/2003 | Siniarski et al. .............. | 454/155 |
| 6,904,688 B1 | * | 6/2005 | Henry .............................. | 33/265 |
| 7,056,203 B2 | * | 6/2006 | Shibata et al. ................. | 454/155 |
| 7,238,103 B2 | * | 7/2007 | Terai et al. ..................... | 454/155 |
| 7,527,553 B2 | * | 5/2009 | Steinbeiss ...................... | 454/155 |
| 7,601,928 B1 | * | 10/2009 | Magness et al. .............. | 200/345 |
| 2004/0072533 A1 | * | 4/2004 | Cho ................................ | 454/155 |
| 2004/0127153 A1 | | 7/2004 | Demerath | |
| 2005/0176364 A1 | * | 8/2005 | Gehring et al. ............... | 454/155 |
| 2006/0052046 A1 | * | 3/2006 | Krause et al. ................. | 454/155 |
| 2006/0172681 A1 | | 8/2006 | Steinbeiss | |
| 2006/0186689 A1 | * | 8/2006 | Gresham et al. ............... | 296/70 |
| 2007/0111653 A1 | * | 5/2007 | Endou ............................ | 454/155 |
| 2010/0263401 A1 | * | 10/2010 | Sakakibara et al. ............ | 62/408 |

FOREIGN PATENT DOCUMENTS

| | | |
|---|---|---|
| DE | 3244729 C2 | 6/1984 |
| DE | 29911534 U1 | 9/1999 |
| DE | 19924493 C1 | 7/2000 |
| DE | 19910774 A1 | 9/2000 |
| DE | 20210038 U1 | 11/2002 |
| DE | 10350949 A1 | 11/2004 |
| GB | 2132336 A | 7/1984 |
| WO | 2008014451 A2 | 1/2008 |

\* cited by examiner

*Primary Examiner* — Kang Hu
*Assistant Examiner* — John Bargero
(74) *Attorney, Agent, or Firm* — Ingrassia Fisher & Lorenz, P.C.

(57) ABSTRACT

A passenger air vent is provided for a cockpit of a motor vehicle. The passenger air vent includes, but is not limited to a nozzle which has adjustable blades on the air outlet side, a control element for adjusting the blades, a separate bezel for the control element, and the bezel and nozzle are formed as two pieces.

4 Claims, 3 Drawing Sheets

PASSENGER AIR VENT

CROSS-REFERENCE TO RELATED APPLICATION

This application claims priority to German Patent Application No. 102008017211.1, filed Apr. 4, 2008, which is incorporated herein by reference in its entirety.

TECHNICAL FIELD

The invention relates to a passenger air vent for a motor vehicle, in particular for a passenger car.

BACKGROUND

Passenger air vents for passenger cars are generally known and comprise a nozzle for the air supply into the passenger compartment, which nozzle has adjustable blades on the outlet side to feed the air directed into the passenger compartment. In most cases, the rib-shaped blades, which are parallel to one another, can be swiveled about an approximately vertically extending axis. This is carried out with a mechanical, manually actuatable control element which is arranged lateral to, above, or below the nozzle.

Within the motor vehicle production, the passenger air vent is to be integrated harmonically together with other components into the cockpit area. Hereby, for the control element, a separate bezel can be used which is formed as one piece with the nozzle.

In practice, passenger air vents without separate bezels are also known. In such cases, in the vehicle production, a large bezel is installed which serves as bezel for different cockpit components and, among other things, for the passenger air vent. This variant offers a different esthetic impression than the one of the last paragraph because the passenger air vent is built-in recessed. Hence, passenger air vents with and without separate bezels represent different approaches of designing the cockpit so that these two types of passenger air vents are not interchangeable.

It is at least one object of an embodiment of the invention to provide a passenger air vent with a separate bezel, which bezel facilitates the installation of components to be arranged adjacent to the passenger air vent. In addition, other objects, desirable features, and characteristics will become apparent from the subsequent summary and detailed description, and the appended claims, taken in conjunction with the accompanying drawings and this background.

SUMMARY

A first embodiment of the invention relates to a passenger air vent for the cockpit of a motor vehicle with a nozzle which, at its nozzle outlet or air outlet opening, respectively, has adjustable blades, and with a control element for adjusting the blades. The passenger air vent further has a separate bezel for the control element, wherein bezel and nozzle are formed as two pieces.

As a separate bezel within the scope of this presentation, a bezel is to be understood which serves as a separate part as a bezel only for the control element. This concerns hence a relatively small bezel which encloses only the control element but no further components, and which, in particular, is not part of a large bezel or bezel construction, respectively, in the sense of the last paragraph of the preceding page, for example for the center console which encloses a plurality of components.

The passenger air vent of this embodiment consists of two pieces. During the assembly of the cockpit, in this embodiment of the passenger air vent, the nozzle is positioned in a first work step, and subsequently, in a second work step, the separate bezel for the mechanical control element, for example, a knurled dial or a slider is positioned. Between these two steps, adjacent or abutting components, respectively, can be easier assembled because the bezel is not yet in its desired position.

An easier assembly arises, for example, when the mounting screws of the car radio located next to the passenger air vent are arranged behind the bezel. With a two-piece design, the screwing can take place without a problem between the two aforementioned work steps because the screwing position is then freely accessible. Since the bezel is not in the way during screwing, the screw driver does not to be applied beveled to the screw axis so that the screwing, in particular when carried manually and with work gloves, can be done faster, more reliable, and with less rejects.

Furthermore, the two-piece design results in improved service-friendliness since, in the case of service, the adjacent component, in the exemplary case the car radio, can be easier disassembled. The working time required for this is reduced since the passenger air vent does not have to be disassembled.

Here, in addition, the risk is reduced that during disassembly of the adjacent component, the passenger air vent gets damaged and has to be replaced, so that the repair costs are potentially lower.

In a second embodiment, the bezel is movably connected with the nozzle, for example by means of a rebound strap.

By means of the movable connection, it is ensured that the right bezel is assembled. In particular, for the passenger air vents to be assembled in a motor vehicle, different bezels can be used, for example, because they are used in the cockpit area on the left or on the right, or because the bezels are differently colored.

Furthermore, it is prevented that the worker has to take the bezel out of a storage container so that the assembly time is reduced.

In a further embodiment, the bezel is connected with the nozzle and rotatable about an axis perpendicular to the bezel face. This formation is advantageous for a rectangular bezel shape so that by means of rotating the bezel, at least that cockpit area becomes freely accessible, which is located behind the outer ends of the bezel with respect to the longitudinal direction. This result in the possibilities during the assembly of the cockpit as already described in connection with the first embodiment.

Furthermore, an embodiment can be provided in which the bezel is attached to the nozzle and swivelable about an axis parallel to the bezel face. The bezel can then be swiveled completely to the side, whereby the entire area behind the bezel becomes freely accessible. This results again in the possibilities during the assembly of the cockpit as described in connection with the first embodiment.

A concretization of the last-mentioned embodiment lies in the fact that the nozzle has a fixedly connected swivel pin to which a bushing of the bezel is assigned or vice versa. Swivel pin and bushing can each be molded parts here. In the assembled position of the passenger air vent, the swivel pin lies vertical or horizontal and is in engagement with the bushing so that the bezel can be shut or turned away. This simplifies the assembly of the cockpit because the worker, in particular when wearing gloves, can carry out a screwing of the adjacent component with the one hand and subsequently, with the other hand, can complete the assembly of the passenger air vent by simply tilting-shut the bezel. Here it is not necessary to change hands, and no further parts, in particular the bezel itself, have to be picked up so that the assembly is carried out particularly fast and reliable even with work gloves.

Alternatively to the last-mentioned embodiment, it can also be provided that the nozzle is connected with the bezel by means of a hinge. Since, considered over the lifetime of a vehicle, only few assemblies and disassemblies are required, a hinge consisting of plastic is sufficient here.

Furthermore, it can be provided that the bezel is designed movable in longitudinal direction, for example by means of a linear guiding, so that in case of need, a screwing of the adjacent cockpit component is simplified in that the angle between the screw axis and the axis of the screw driver is decreased. However, this embodiment can also be combined with the aforementioned embodiments so that the bezel carries out a combined rotational and longitudinal movement. For example, the bezel can be moved away with a longitudinal movement in longitudinal direction of the vehicle from the rest of the cockpit and can subsequently be rotated in the sense of the third embodiment about an axis parallel to the longitudinal direction of the vehicle or perpendicular to the bezel face, respectively, to make the outer bezel areas accessible.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
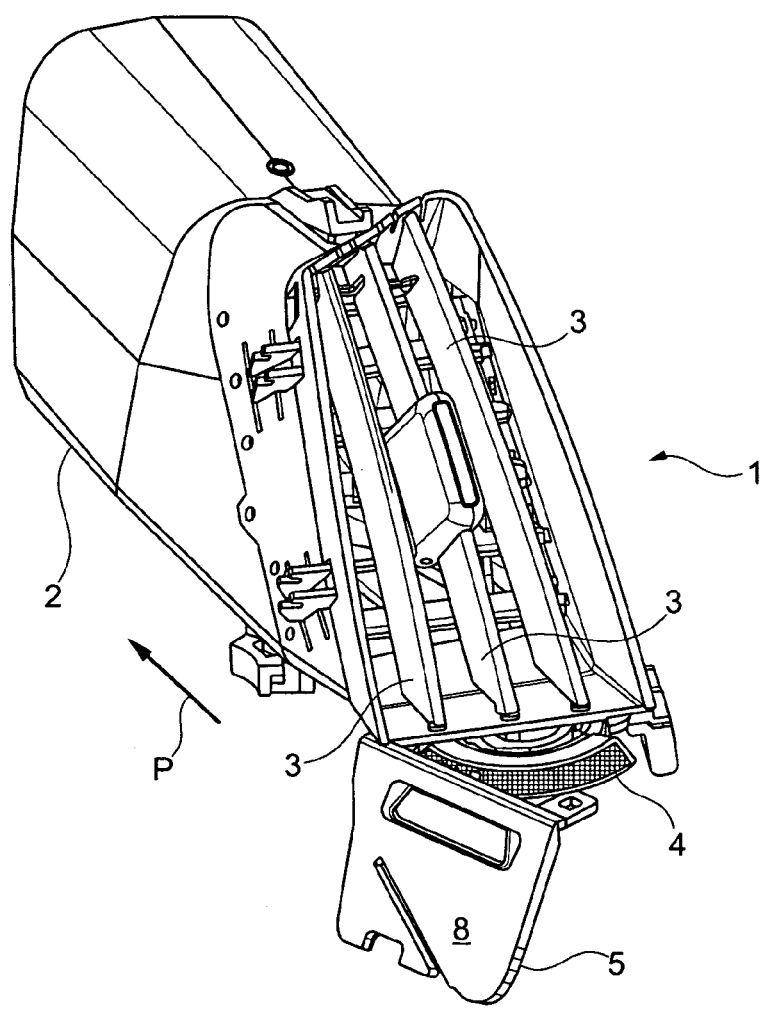
FIG. 1 shows a passenger air vent in a perspective view from above with a swiveled-out bezel.

In the figures which, in general, denote with the same reference numbers the same objects, FIG. 1 shows a passenger air vent 1 comprising a nozzle 2 with swivelable blades 3. The swivel position of the swivelable blades 3, which can be swiveled about their longitudinal axis, can be manually adjusted by means of a control element 4 formed as a knurled dial.

For the control element 4, a separate bezel is provided. The nozzle 2 is made of plastic and has an integrally molded swivel pin 6 which is in engagement with the bushing 7 of the bezel 5, cf. FIG. 2, so that the bezel 5 is pivotably attached to the nozzle 2.

Figure 2:
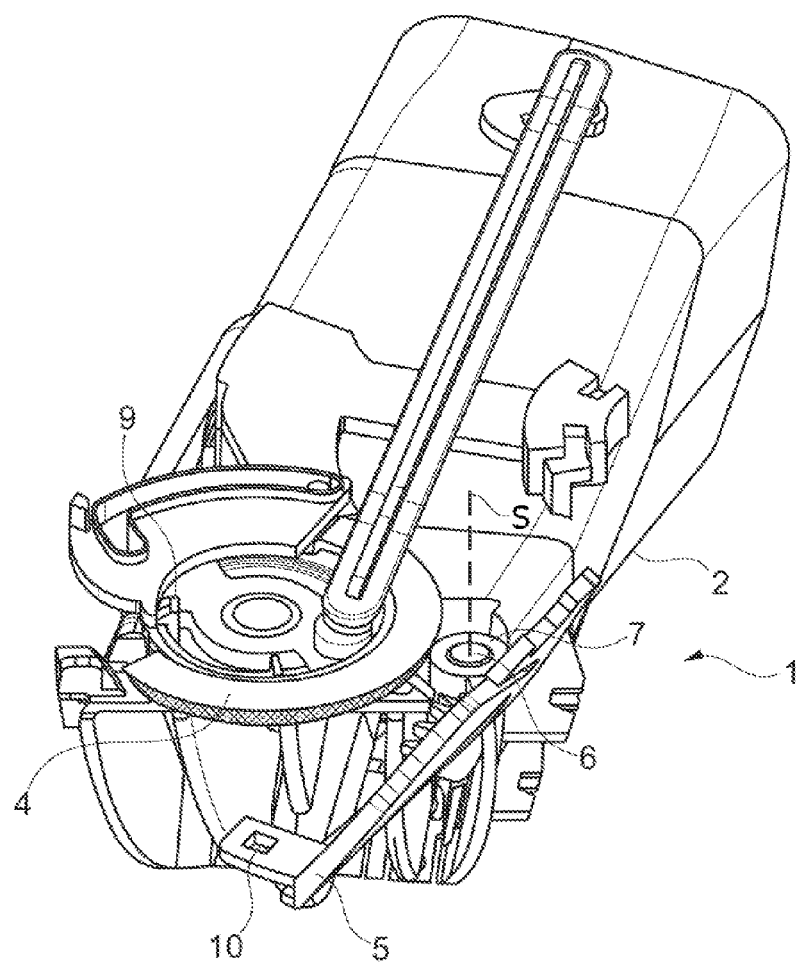
FIG. 2 shows a passenger air vent in a perspective view from underneath with a swiveled-in bezel.
Figure 3:
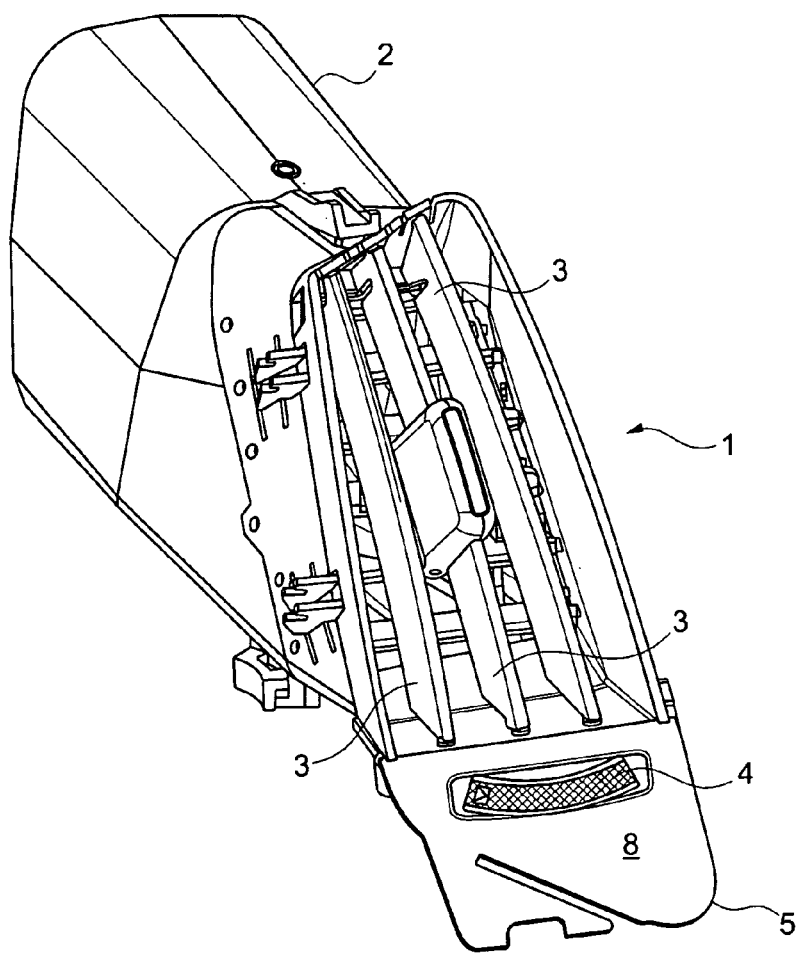
FIG. 3 shows a passenger air vent in a perspective view from above with a swiveled-in bezel.

FIG. 1 shows the passenger air vent 1 with bezel 5 in a swiveled-out position as it would be supplied to an automobile company. During assembly, the passenger air vent is moved first in direction of the arrow P to its assembly position, and the cockpit area below the control element 4 is then freely accessible. Thus, for example, screws which are located there for fastening a car radio can be tightened without a problem. Subsequently, the bezel 5 is moved about the swivel axis S, and finally the latching nose 9 molded on the nozzle 2 snaps into a recess 10 of the bezel 5. The result is shown in FIG. 2 in a perspective view from above or in FIG. 3, respectively, in a perspective view from below.

The mentioned work steps can be carried out by a worker even with gloves without problems. After the nozzle 2 is assembled, in this embodiment, it is not necessary, for example, to pick up a separate bezel from the storage container and to mount it precisely fitting since the bezel 5 is already rotatably attached to the nozzle 2. By using separate bezels, in this embodiment, a mix-up can not occur and the storage or inventory of bezels or assigned fasteners is prevented. Furthermore, for example, a screw can easily be tightened with the right hand and the bezel can then be swiveled-shut with the left hand. The passenger air vent is designed with the intention to make the assembly as simple as possible and, at the same time, to minimize the assembly time.

Although above, concrete embodiments are described, the person skilled in art the will appreciate that the description of these embodiments is not intended to limit the invention in the stated form. The embodiments of the invention are rather intended to comprise all modifications, equivalents, and alternatives which come into the scope of the claimed invention.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A passenger air vent for a cockpit of a motor vehicle, comprising: a nozzle having adjustable blades on an air outlet side wherein the nozzle is formed from a first piece and has a swivel pin on a side thereof; a control element for adjusting the adjustable blades; and a separate bezel having an opening surrounding only the control element, the separate bezel formed of a second piece separate from the first piece, pivotably attached to the swivel pin wherein the separate bezel encloses only the control element, wherein the entire area behind the separate bezel becomes freely accessible by swiveling the separate bezel about the swivel pin.

2. The passenger air vent according to claim 1, wherein the swivel pin is fixedly connected to the nozzle and assigned to a bushing of the separate bezel.

3. The passenger air vent according to claim 1, wherein the control element is a knurled dial.

4. The passenger air vent according to claim 1, wherein the control element is a slider.

* * * * *